(12) United States Patent
Ohi et al.

(10) Patent No.: US 7,828,370 B2
(45) Date of Patent: Nov. 9, 2010

(54) VEHICLE BODY STRUCTURE

(75) Inventors: Yoshiaki Ohi, Wako (JP); Tetsuya Gomi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 151 days.

(21) Appl. No.: 12/254,193

(22) Filed: Oct. 20, 2008

(65) Prior Publication Data

US 2009/0108633 A1    Apr. 30, 2009

(30) Foreign Application Priority Data

Oct. 25, 2007 (JP) .............................. 2007-277411
Oct. 25, 2007 (JP) .............................. 2007-277429

(51) Int. Cl.
    *B62D 25/08* (2006.01)
(52) U.S. Cl. .......................... 296/187.08; 296/193.07; 296/30
(58) Field of Classification Search ............ 296/187.08, 296/193.07, 204, 205, 29, 30; 52/633, 653.1
    See application file for complete search history.

(56) References Cited

U.S. PATENT DOCUMENTS

| | | | |
|---|---|---|---|
| 1,854,710 A * | 4/1932 | Mayer | 280/784 |
| 3,328,935 A * | 7/1967 | Peras | 52/630 |
| 4,462,629 A * | 7/1984 | Todori et al. | 296/30 |
| 5,806,918 A * | 9/1998 | Kanazawa | 296/204 |
| 5,992,921 A * | 11/1999 | Seki | 296/187.09 |
| 6,616,217 B1 * | 9/2003 | Robinson | 296/178 |
| 6,834,912 B2 * | 12/2004 | Cardimen et al. | 296/204 |
| 7,014,256 B2 * | 3/2006 | Kamura et al. | 296/193.07 |
| 7,500,714 B2 * | 3/2009 | Abe et al. | 296/193.07 |
| 7,644,978 B2 * | 1/2010 | Tosaka et al. | 296/187.12 |
| 7,690,721 B2 * | 4/2010 | Gruneklee et al. | 296/203.01 |
| 2009/0102238 A1 * | 4/2009 | Gomi | 296/193.07 |
| 2010/0078966 A1 * | 4/2010 | Onoda et al. | 296/193.07 |

FOREIGN PATENT DOCUMENTS

| | | | |
|---|---|---|---|
| JP | 07-291150 | | 11/1995 |
| JP | 2009101772 A | * | 5/2009 |

* cited by examiner

*Primary Examiner*—Patricia L Engle
(74) *Attorney, Agent, or Firm*—Rankin, Hill & Clark LLP

(57) ABSTRACT

A vehicle body structure in which the rigidity of a flat floor panel is increased by increasing the rigidity of intersecting portions between a cross member and floor frames. A plurality of floor frames extending in the longitudinal direction of a vehicle body are aligned in straight rows in the longitudinal direction on either sides of a cross member extending in the vehicle width direction. Terminal ends of the plurality of floor frames are positioned in proximity to the cross member. The intersecting portions between the floor frames and the cross member are joined together by T-shaped connecting members in order to increase rigidity.

1 Claim, 7 Drawing Sheets

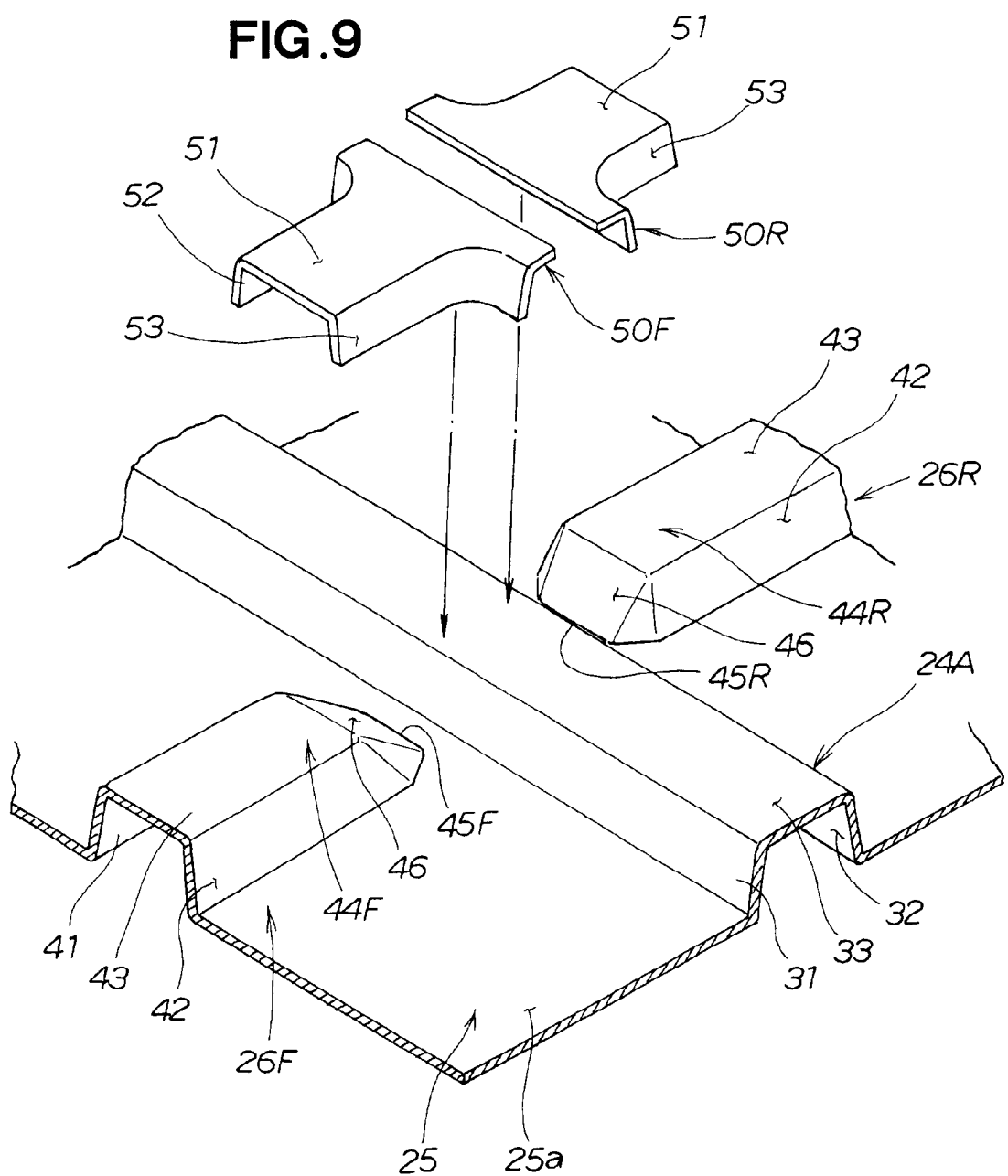

VEHICLE BODY STRUCTURE

FIELD OF THE INVENTION

The present invention relates to a structure of a vehicle body in a passenger vehicle or another vehicle.

BACKGROUND OF THE INVENTION

Various reinforcements are commonly implemented in a vehicle body in order to increase the rigidity of a floor panel and other flat panels, as disclosed in Japanese Patent Application Laid-Open Publication No. 07-291150 (JP 07-291150 A).

In the vehicle body structure disclosed in JP 07-291150 A, a bead (longitudinal bead) that is long and thin in the longitudinal direction of the vehicle body and a bead (transverse bead) that is long and thin in the width direction of the vehicle are formed so as to intersect with each other on the top surface of the floor panel, and a cross member that is long and thin in the width direction of the vehicle is laid over and bonded to the top of the transverse bead, thereby increasing the rigidity of the floor panel.

However, in the aforementioned vehicle body structure, the portion where the longitudinal bead and the transverse bead (equivalent to the floor frame) intersect is no more than a mere space. Specifically, the distal end of the longitudinal bead passes through the vertical walls of the transverse bead. Thus, there is room for improvement in increasing the rigidity of the floor panel in the portions where the beads intersect with each other (particularly, the rigidity with respect to loads acting in the vertical direction of the vehicle body), by means of the longitudinal bead and the transverse bead.

Furthermore, in the aforementioned vehicle body structure, a cross member that is long and thin in the width direction of the vehicle is laid over the transverse bead and is bonded to the longitudinal bead. However, there is a limit on how much of an increase can be achieved by means of this type of configuration in the rigidity of the floor panel in the portions where the beads intersect with each other (particularly, the rigidity with respect to loads acting in the vertical direction of the vehicle body).

Because of this, consideration has been given to adding separate members to increase the rigidity of the intersecting portions, but merely adding members would lead to an increase in the weight of the vehicle body.

SUMMARY OF THE INVENTION

An object of the present invention is to provide a vehicle body structure in which the rigidity of the intersecting portions between cross members and floor frames is increased while increases in the weight of the vehicle body are suppressed.

According to an aspect of the present invention, there is provided a vehicle body structure comprising a floor panel forming part of a vehicle body, and a cross member and a plurality of floor frames provided along one surface of the floor panel. The cross member extends transversely of the vehicle body. The plurality of floor frames is comprised of long, thin beads bulging from the floor panel. The beads extending longitudinally of the vehicle body linearly from front and rear sides of the cross member. The floor frames have terminal ends positioned proximately to the cross member so as to form T shapes jointly with the cross member, and the terminal ends and the cross member are joined together by substantially T-shaped connecting members.

With this arrangement, rigidity (including rigidity against loads in the vertical direction of the vehicle body) of the intersecting portions between the cross member and floor frame is increased by the connecting member.

Moreover, the weight of the vehicle body does not substantially increase because of a configuration merely in which the plurality of floor frames composed of beads that are long and thin in the longitudinal direction of the vehicle body are aligned in straight rows sandwiching the front and rear sides of the cross member, and the cross member and the terminal ends of the floor frames are joined together by the connecting members which have T shapes in a plan view. In other words, rigidity can be increased while weight increases in the vehicle body are suppressed.

Preferably, the cross member is comprised of a bead that bulges upward from the floor panel, the bead being long and thin in the vehicle width direction. As a result, increases in the weight of the vehicle body can be even further suppressed, and rigidity can be increased.

Desirably, the cross member and the plurality of floor frames have inverted U shapes in cross section, composed of left and right vertical walls that rise from the one surface, and top plates that span between the top ends of the left and right vertical walls. The terminal ends and the cross member may be joined together by the connecting members so that the vertical walls are joined together and the top plates are joined together. The left and right vertical walls of the cross member may be connected by two vertical ribs aligned in the middle of the cross member in the longitudinal direction. The two vertical ribs may be disposed so as to be substantially continuous with the left and right vertical walls of the plurality of floor frames.

Consequently, the connecting members have portions (e.g., vertical walls) for joining the vertical walls of the terminal ends and the vertical walls of the cross members, and portions (e.g., top plates) for joining the top plates of the terminal ends and the top plates of the cross members. With this type of configuration, the rigidity (including the rigidity against loads in the vertical directions of the vehicle body) of the intersecting portions between the cross members and floor frames can be increased by the connecting members.

Furthermore, the left and right vertical walls of the cross members are connected by the two vertical ribs, and the vertical ribs are disposed so as to be substantially continuous with all of the left and right vertical walls of the floor frames. Therefore, the vertical walls of the floor frames, the vertical walls of the connecting members, and the vertical ribs extend in a generally continuous manner along straight lines. Therefore, the rigidity (including the rigidity against loads in the vertical directions of the vehicle body) of the intersecting portions between the cross members and the floor frames can be further increased by the connecting members.

Moreover, the weight of the vehicle body does not substantially increase because of a configuration merely in which the floor frames composed of beads that are long and thin in the longitudinal direction of the vehicle body are aligned in straight rows sandwiching the front and rear sides of the cross members, the terminal ends of the floor frames and the cross members are joined together by the connecting members which have T shapes in a plan view, and the left and right vertical walls of the cross members are connected by the two vertical ribs. In other words, rigidity can be increased while weight increases in the vehicle body are suppressed.

BRIEF DESCRIPTION OF THE DRAWINGS

Certain preferred embodiments of the present invention will be described in detail below, by way of example only, with reference to the accompanying drawings, in which:

FIG. 9 is an exploded perspective view showing the connecting members, floor frame and cross member of FIG. 7.

DETAILED DESCRIPTION OF THE PREFERRED EMBODIMENTS

Figure 1:
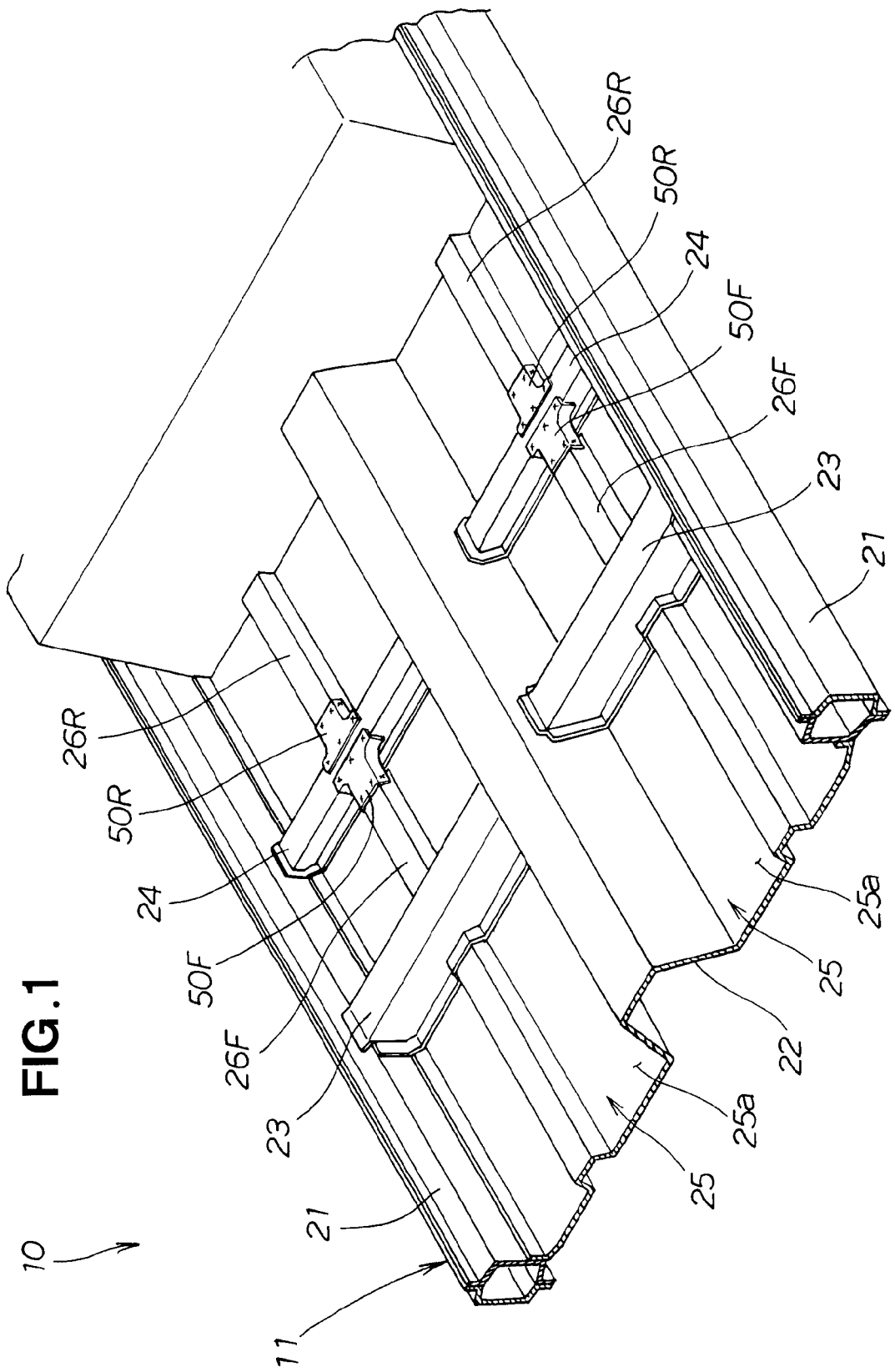
FIG. 1 is a perspective view showing a vehicle body structure according to the present invention, as seen from within a passenger compartment.
Figure 2:
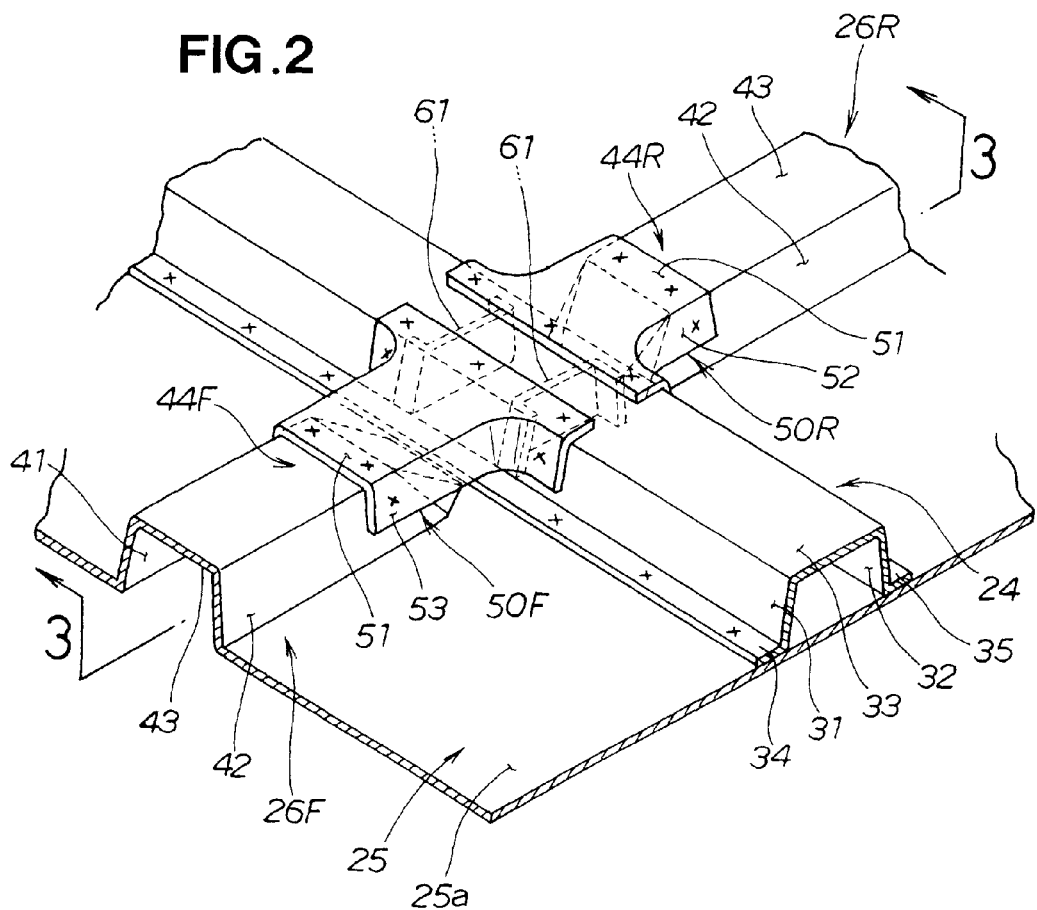
FIG. 2 is a perspective view showing a floor frame and a cross member of FIG. 1 as connected together by connecting members.

A vehicle body 11 (specifically, a vehicle body frame 11) of a vehicle 10 is composed of a monocoque body, as shown in FIG. 1.

The passenger compartment portion in the vehicle body 11 is composed of left and right side sills 21, 21 extending in the longitudinal direction of the vehicle body 11, a floor tunnel 22 extending in the longitudinal direction of the vehicle body 11 in the widthwise center of the vehicle 10, two front and rear cross members 23, 24 extending in the vehicle width direction so as to span between the left and right side sills 21, 21 and the floor tunnel 22, front floor panels 25, 25 spread out between the left and right side sills 21, 21 and the floor tunnel 22 and a plurality of floor frames 26F, 26R extending in the longitudinal direction of the vehicle body 11 to the left and right sides of the floor tunnel 22.

The rear cross members 24 are articles folded from steel sheets. The rear cross members 24 have a substantially inverted U shape in cross section, and flanges 34, 35 extend sideways from the sides of the cross members, as shown in FIGS. 2 through 5. The flanges 34, 35 are bonded to top surfaces 25a of the front floor panels 25. Specifically, the cross members 24 are each composed of a pair of left and right vertical walls 31, 32 that rise from the top surfaces 25a (one set of surfaces 25a) of the front floor panels 25, top plates 33 that span between the top ends of the left and right vertical walls 31, 32, and the left and right flanges 34, 35 which extend to the sides from the bottom ends of the left and right vertical walls 31, 32.

Since the cross members 24 extend in the vehicle width direction as described above, the vertical walls 31 on the left side face toward the front of the vehicle body, and the vertical walls 32 on the right side face towards the rear of the vehicle body. For the sake of easier comprehension in the description, the left vertical walls 31 are hereinbelow referred to as the "front vertical walls 31," and the right vertical walls 32 are referred to as the "rear vertical walls 32."

The front floor panels 25 are composed of steel sheets as shown in FIGS. 2 through 5. The floor frames 26F, 26R swell upward from the top surfaces 25a of the front floor panels 25 and form long, thin beads extending in the longitudinal direction of the vehicle body 11. These beads are formed on the front floor panels 25 by embossing so as to swell upward from the top surfaces 25a, and are shaped as grooves as seen from the underside of the front floor panels 25.

To be more specific, the floor frames 26F, 26R are formed into inverted U shapes in cross section, and are each composed of a pair of left and right vertical walls 41, 42 that rise from the top surfaces 25a of the front floor panels 25, and top plates 43 that span between the top ends of the left and right vertical walls 41, 42.

The plurality of floor frames 26F, 26R provided on the left side of the floor tunnel 22 (FIG. 1) are aligned in a straight row, sandwiching the rear cross member 24 at the front and rear sides. The plurality of floor frames 26F, 26R provided on the right side of the floor tunnel 22 are aligned in the same manner.

The floor frames 26F, which are aligned to the front of the vehicle body with respect to the rear cross members 24, are hereinbelow referred to as the "front floor frames 26F," and the floor frames 26R aligned to the rear with respect to the vehicle body are referred to as the "rear floor frames 26R."

Terminal ends 44F of the front floor frames 26F are positioned in proximity to the front vertical walls 31 in the cross members 24. Terminal ends 44R of the rear floor frames 26R are positioned in proximity to the rear vertical walls 32 in the cross members 24. The terminal ends 44F, 44R are the ends of the beads. The result is that in a plan view, the front terminal ends 44F and the rear terminal ends 44R are arranged in T shapes with respect to the cross members 24.

Figure 3:
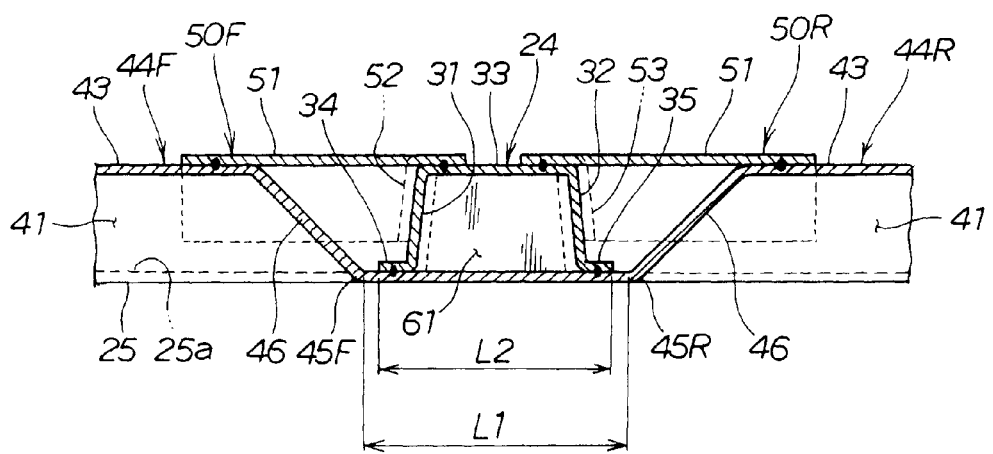
FIG. 3 is a cross-sectional view taken along line 3-3 of FIG. 2.
Figure 5:
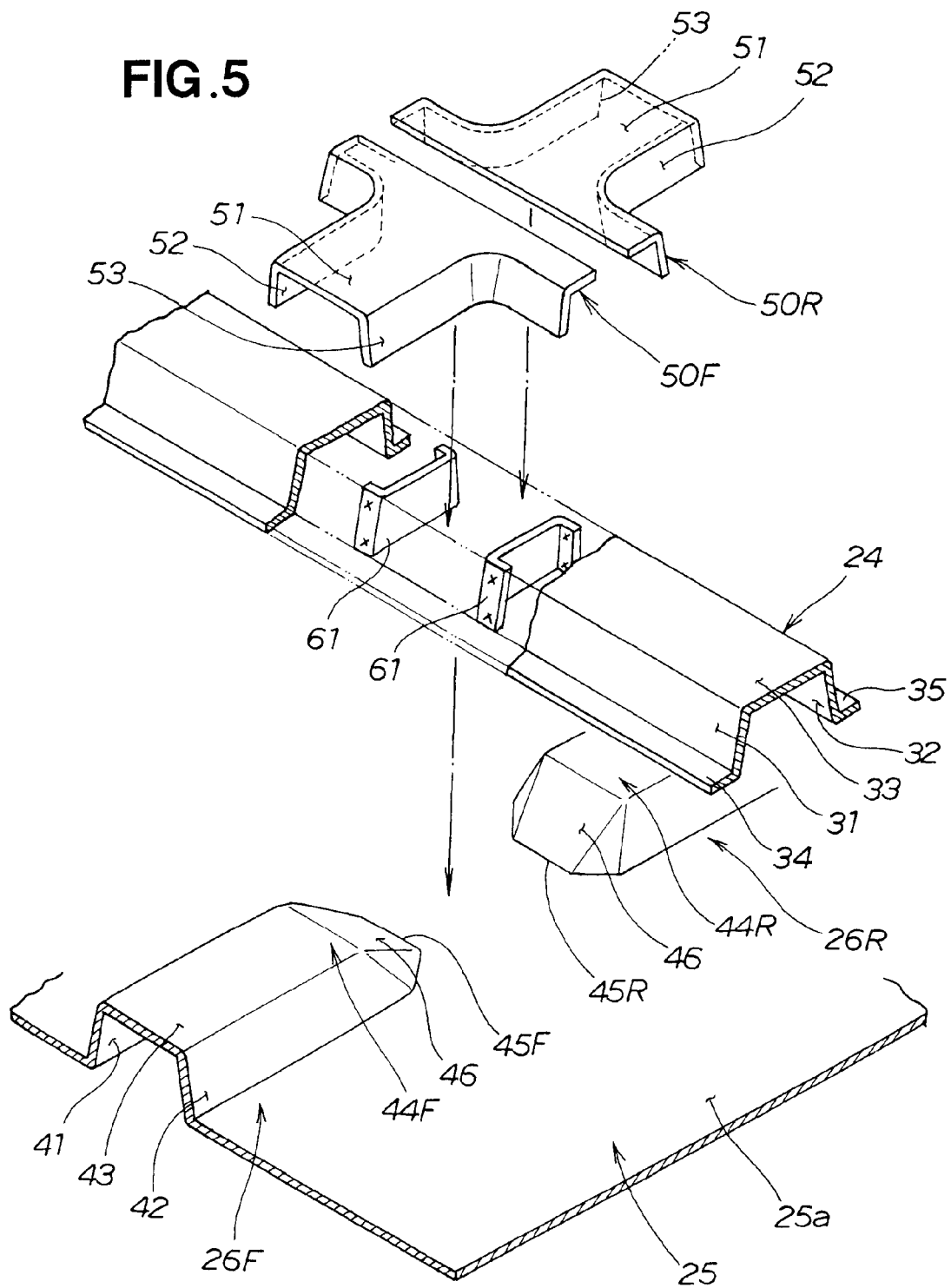
FIG. 5 is an exploded perspective view showing the connecting members, floor frame and cross member of FIG. 2.

In the front floor panels 25, the spaces from distal ends 45F of the front terminal ends 44F to distal ends 45R of the rear terminal ends 44R are devoid of the floor frames 26F, 26R and are therefore flat, as shown in FIGS. 3 and 5. In other words, the front and rear distal ends 45F, 45R are the same height as the top surfaces 25a of the front floor panels 25. The separation distance L1 between the front and rear distal ends 45F, 45R is slightly greater than the outside width L2 of the pairs of flanges 34, 35 in the cross members 24. Inclined top plates 46 that are inclined from the top plates 43 toward the distal ends 45F extend from the front terminal ends 44F. The rear terminal ends 44R similarly have inclined top plates 46.

Next, in FIGS. 2 through 5, the bonding structure of the rear cross members 24 and the floor frames 26F, 26R will be described.

In the cross members 24 and the front terminal ends 44F, the vertical walls 31, 41, 42 are joined together, as are the top plates 33, 43, by front connecting members 50F. In the cross members 24 and the rear terminal ends 44R, the vertical walls 32, 41, 42 are joined together, as are the top plates 33, 43, by rear connecting members 50R.

The front and rear connecting members 50F, 50R are iron and steel articles formed into T shapes in a plan view, and are composed of folded or cast steel sheets, for example.

The front connecting members 50F are integrally formed articles composed of top plates 51 having T shapes in a plan view, and pairs of left and right vertical walls 52, 53 extending toward the front floor panels 25 from the sides of the stems of the top plates 51. The top plates 51 are horizontal flat portions that join together the top plates 33 of the cross members 24 and the top plates 43 in the front terminal ends 44F. The left and right vertical walls 52, 53 join together the vertical walls 41, 42 of the terminal ends 44F and the front vertical walls 31 in the cross members 24, and the left and right vertical walls 52, 53 are formed into L shapes in a plan view.

The rear connecting members 50R are configured substantially the same as the front connecting members 50F, and are longitudinally reversed from the front connecting members 50F. Specifically, the top plates 51 in the rear connecting members 50R join together the top plates 33 of the cross members 24 and the top plates 43 in the rear terminal ends 44R. The left and right vertical walls 52, 53 in the rear connecting members 50R join together the rear vertical walls 32 in the cross members 24 and the vertical walls 41, 42 in the terminal ends 44R.

The joining procedure using the front connecting members 50F is as follows.

First, the front connecting members 50F are placed over the cross members 24 and the front terminal ends 44F, which are disposed in T shapes in a plan view.

The top plates 51 of the connecting members 50F are then joined to the top plates 33 of the cross members 24, and the top plates 51 of the connecting members 50F are joined to the top plates 43 of the terminal ends 44F. The result is that the top plates 33, 43 can be joined together by the top plates 51 of the connecting members 50F.

Furthermore, the vertical walls 52, 53 of the connecting members 50F are joined to the front vertical walls 31 of the cross members 24, and the vertical walls 52, 53 of the connecting members 50F are joined to the vertical walls 41, 42 in the terminal ends 44F. The result is that the front vertical walls 31 and the vertical walls 41, 42 of the terminal ends 44F can be joined together by the vertical walls 52, 53 of the connecting members 50F.

Thus, the cross members 24 and the front terminal ends 44F are joined together by the front connecting members 50F.

The joining by means of the rear connecting members 50R follows the same joining procedure as the front connecting members 50F.

First, the rear connecting members 50R are placed over the cross members 24 and the rear terminal ends 44R, which are disposed in T shapes in a plan view.

The top plates 51 of the connecting members 50R are then joined to the top plates 33 of the cross members 24, and the top plates 51 of the connecting members 50R are joined to the top plates 43 of the terminal ends 44R. The result is that the top plates 33, 43 can be joined together by the top plates 51 of the connecting members 50R.

Furthermore, the vertical walls 52, 53 of the connecting members 50R are joined to the rear vertical walls 32 of the cross members 24, and the vertical walls 52, 53 of the connecting members 50R are joined to the vertical walls 41, 42 in the terminal ends 44R. The result is that the rear vertical walls 32 and the vertical walls 41, 42 of the terminal ends 44R can be joined together by the vertical walls 52, 53 of the connecting members 50R.

Thus, the cross members 24 and the rear terminal ends 44R are joined together by the rear connecting members 50R.

As is clear from the above description, according to the present embodiment, the front and rear (plurality of) floor frames 26F, 26R composed of beads that are long and thin in the longitudinal direction of the vehicle body 11 are aligned in straight rows sandwiching the front and rear sides of the cross members 24, the terminal ends 44F, 44R in the front and rear floor frames 26F, 26R are positioned in proximity to the cross members 24, and the vertical walls 31, 32, 41, 42 and top plates 33, 43 in the terminal ends 44F, 44R and cross members 24 are joined together by the connecting members 50F, 50R which have T shapes in a plan view. With this type of configuration, the rigidity (including rigidity against loads in the vertical directions of the vehicle body 11) of the intersecting portions between the cross members 24 and the front and rear floor frames 26F, 26R can be increased by the connecting members 50F, 50R.

Moreover, the weight of the vehicle body 11 does not substantially increase because of a configuration merely in which the front and rear floor frames 26F, 26R composed of beads that are long and thin in the longitudinal direction of the vehicle body 11 are aligned in straight rows sandwiching the front and rear sides of the cross members 24, and the cross members 24 and the terminal ends 44F, 44R in the front and rear floor frames 26F, 26R are joined together by the connecting members 50F, 50R which have T shapes in a plan view. In other words, rigidity can be increased while weight increases in the vehicle body 11 are suppressed.

Furthermore, since the cross members 24 have inverted U shapes, the cross members 24 are groove-shaped when viewed from below. The front vertical walls 31 and rear vertical walls 32 of the cross members 24 are connected to each other by two vertical ribs 61, 61 aligned inside the grooves in the longitudinal direction of the cross members 24. The two vertical ribs 61, 61 are flat plates that are perpendicular in relation to the top surfaces 25a of the front floor panels 25, and are dividing walls (bulkheads) that partition the grooves of the cross members 24 in the longitudinal direction. The rigidity of the cross members 24 is increased by the two vertical ribs 61, 61.

The rigidity of the cross members 24 is further increased if the vertical ribs 61, 61 are also joined to the top plates 33 of the cross members 24.

Figure 4:
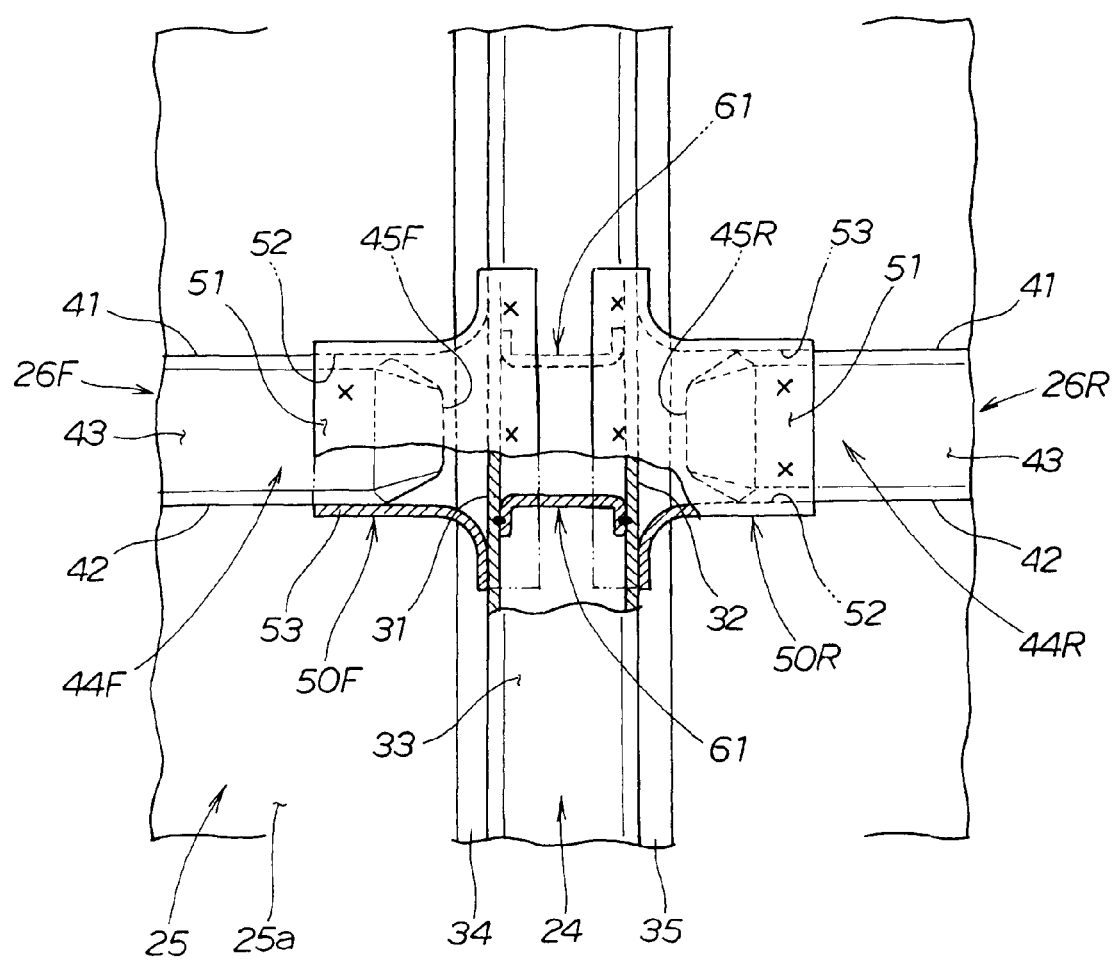
FIG. 4 is a top plan view showing the floor frame, cross member and connecting members of FIG. 2, with part cut away.

The two vertical ribs 61, 61 are disposed so as to be substantially continuous with the left and right vertical walls 41, 42 in the front and rear floor frames, as shown in FIG. 4. Therefore, the vertical walls 41, 42 of the floor frames 26F, 26R, the vertical walls 52, 53 of the connecting members 50F, 50R, and the vertical ribs 61, 61 extend in a generally continuous manner along straight lines. Consequently, the rigidity (including the rigidity against loads in the vertical directions of the vehicle body) of the intersecting portions between the cross members 24 and the front and rear floor frames 26F, 26R can be further increased by the connecting members 50F, 50R.

Moreover, the weight of the vehicle body 11 does not substantially increase because of a configuration merely in which the front and rear floor frames 26F, 26R composed of beads that are long and thin in the longitudinal direction of the vehicle body are aligned in straight rows sandwiching the front and rear sides of the cross members 24, the cross members 24 and the terminal ends 44F, 44R in the front and rear floor frames 26F, 26R are joined together by the connecting members 50F, 50R which have T shapes in a plan view, and the front and rear vertical walls 31, 32 in the cross members 24 are connected by the two vertical ribs 61, 61. In other words, rigidity can be increased while weight increases in the vehicle body 11 are suppressed.

Figure 6:
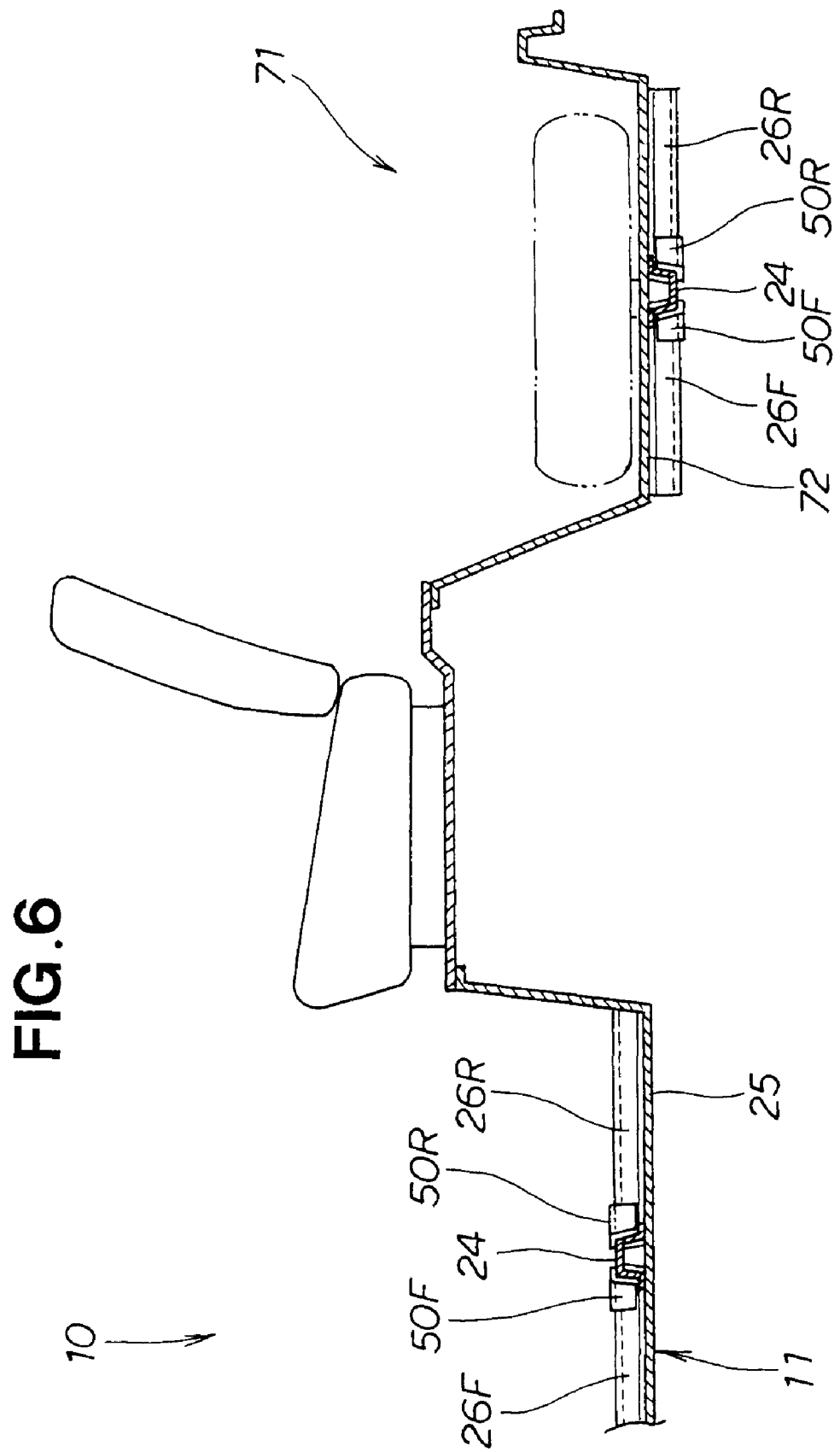
FIG. 6 is a schematic view showing an example in which the connecting members of FIG. 1 are applied to other parts of a vehicle body.

The configuration in which the cross members 24 and the front and rear floor frames 26F, 26R are bonded by the connecting members 50F, 50R as shown in FIGS. 1 through 5 can be applied to other areas in the vehicle body 11 as shown in FIG. 6. FIG. 6 shows an application example in which the connecting members shown in FIG. 1 are applied to other parts of the vehicle body 11.

The application example shows an example in which in a cargo space 71 in the rear of a vehicle 10, cross members 24 and front and rear floor frames 26F, 26R are aligned to reinforce the bottom surface of rear floor panels 72 of the vehicle body 11, and the cross members 24 and front and rear front floor frames 26F, 26R are bonded by connecting members 50F, 50R. According to the application example, a sufficient amount of space is ensured in the cargo space 71, and lightweight and highly rigid rear floor panels 72 can be configured.

Figure 7:
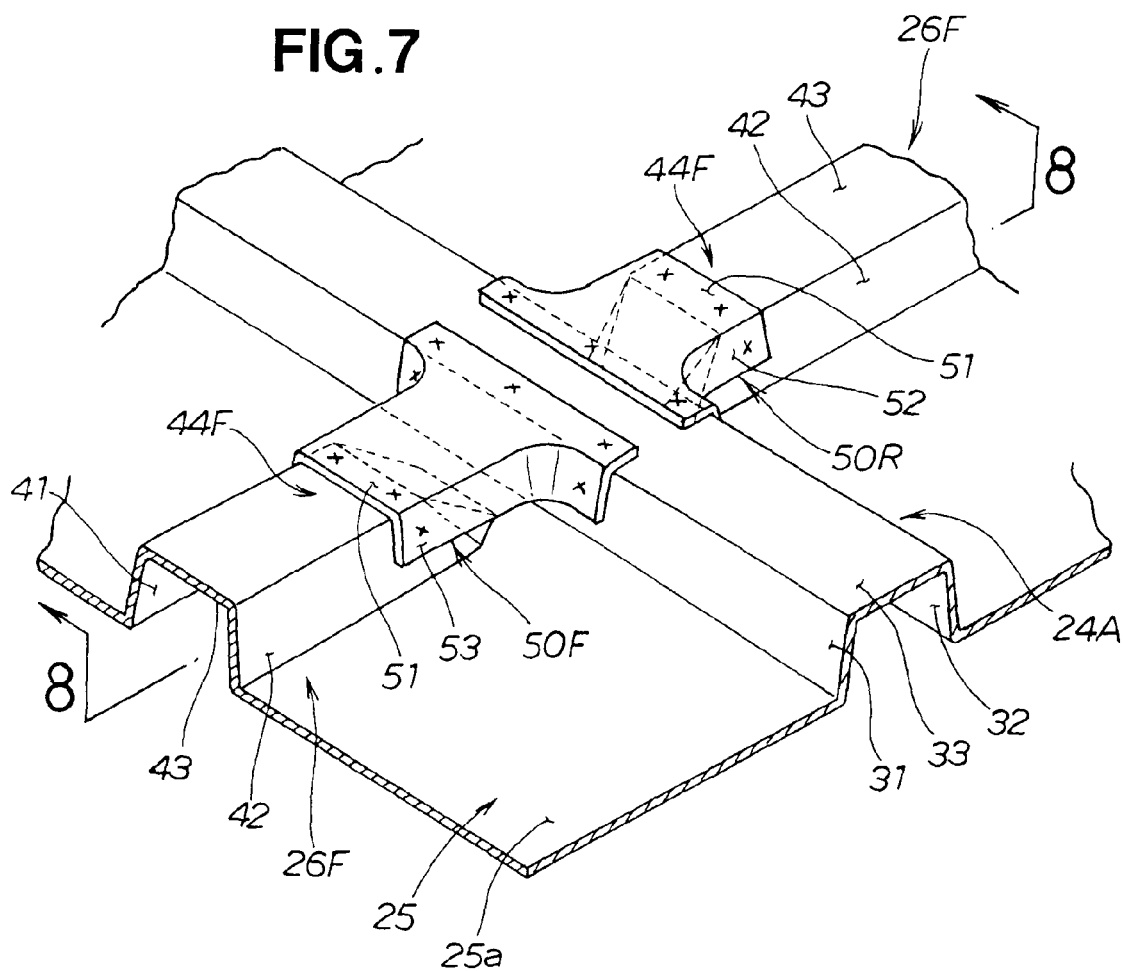
FIG. 7 is a perspective view corresponding to FIG. 2, but showing a modification of connecting members, floor frame and cross member.
Figure 8:
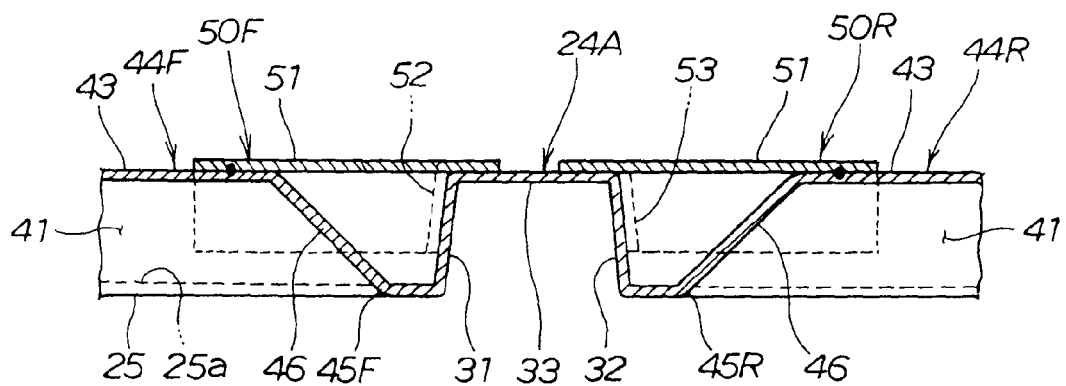
FIG. 8 is a cross-sectional view taken along line 8-8 of FIG. 7.

FIGS. 7 through 9 show a modification of the cross members shown in FIGS. 1 through 5. Components similar to those of the embodiment shown in FIGS. 1 through 5 are denoted by the same numerical symbols and are not described.

The cross members 24A of the modification are configured from beads formed integrally with front floor panels 25, as are the floor frames 26F, 26R. The cross members 24A of the modification are composed of pairs of left and right vertical walls 31, 32 (front vertical walls 31 and rear vertical walls 32), and top plates 33 that span between the top ends of the left and right vertical walls 31, 32.

Thus, since the cross members 24A are configured from beads that swell upward from the front floor panels 25 and that are long and thin in the vehicle width direction, rigidity can be increased while weight increases in the vehicle body 11 are further suppressed.

In the present invention, the material of the connecting members 50F, 50R is not limited to metal, and the connecting members may be resinous articles, for example.

Obviously, various minor changes and modifications of the present invention are possible in light of the above teaching. It is therefore to be understood that within the scope of the appended claims the invention may be practiced otherwise than as specifically described.

What is claimed is:

1. A vehicle body structure, comprising:

a floor panel forming part of a vehicle body; and a cross member and a plurality of floor frames provided along one surface of the floor panel, wherein the cross member extends transversely of the vehicle body, the plurality of floor frames is comprised of long, thin beads bulging from the floor panel, the beads extending longitudinally of the vehicle body linearly from front and rear sides of the cross member, the floor frames have terminal ends positioned proximately to the cross member so as to form T shapes jointly with the cross member, and the terminal ends and the cross member are joined together by substantially T-shaped connecting members, and wherein the cross member and the floor frames have inverted U shapes in cross section composed of left and right vertical walls that rise from the one surface, and top plates that span between the top ends of the left and right vertical walls, the terminal ends and the cross member are joined together by the connecting members such that the vertical walls are joined together and the top plates are joined together, the left and right vertical walls of the cross member are connected by two vertical ribs arranged in a longitudinally mid-part of the cross member, and the two vertical ribs are disposed to be substantially continuous with the left and right vertical walls of the floor frames.

* * * * *